United States Patent [19]

Motto

[11] Patent Number: 5,002,298
[45] Date of Patent: Mar. 26, 1991

[54] HAND ASSISTED PROPULSION APPARATUS FOR BICYCLE

[76] Inventor: Guy R. Motto, 1220 S.E. 6th Ter., Cape Coral, Fla. 33990

[21] Appl. No.: 423,385

[22] Filed: Oct. 19, 1989

[51] Int. Cl.⁵ .............................................. B62M 1/12
[52] U.S. Cl. ............................... 280/233; 280/242.1; 280/288.4; 74/525; 74/562; 74/594.4
[58] Field of Search .............. 280/210, 233, 242.1, 280/288.4, 235; 74/525, 562, 594.4, 594.7

[56] References Cited

U.S. PATENT DOCUMENTS

| | | | |
|---|---|---|---|
| 3,895,825 | 7/1975 | Sink | 280/255 |
| 4,354,691 | 10/1982 | Sanders et al. | 280/250.1 |
| 4,867,441 | 9/1989 | Blakeman | 74/562 |

FOREIGN PATENT DOCUMENTS

| | | | |
|---|---|---|---|
| 0295590 | 2/1929 | Italy | 280/233 |
| 0008247 | 4/1896 | United Kingdom | 280/233 |

*Primary Examiner*—Charles A. Marmor
*Assistant Examiner*—Mitchell Bompey
*Attorney, Agent, or Firm*—William E. Noonan

[57] ABSTRACT

The hand assisted propulsion for a bicycle embodies special foot pedals which have their shafts extended. The shaft extension is engaged in a roller bearing at one end of a hand crank. At the other end of the hand crank is a handle used by the cyclist to augment the operation of the foot pedal. This provides hand and arm exercise to the cyclist as well as increasing the power driving the bicycle's rear wheel.

7 Claims, 1 Drawing Sheet

HAND ASSISTED PROPULSION APPARATUS FOR BICYCLE

BACKGROUND OF THE INVENTION

1. Field of the Invention

This invention relates in general to bicycles, and in particular to a means for both assisting in its propulsion, and increasing the exercise benefits derived from bicycling by permitting active use of the hands and arms of the rider.

2. Prior Art

Bicycling is a very popular sport and means of exercise. However, in recreational cycling, primarily the legs and lower body are active. The arms and lower body do not fully participate. There have been a number of devices patented to overcome this shortcoming.

An "Exercise Apparatus", DeBoer U.S. Pat. No. 4,705,269, is a stationary machine providing exercise for the upper body as well as the lower body. This machine is for exercise only, and does not afford the enjoyment which comes from riding a bicycle outdoors.

A "Reciprocating and Oscillating Drive Mechanism", Patroni U.S. Pat. No. 4,548,420, incorporates a crankshaft operated by the arms to drive the front wheel of a bicycle. "Front Wheel Drive for Bicycles", Hendricks, U.S. Pat. No. 3,193,305 also affords front wheel drive by use of arms through a lever and sprocket. Both of these arrangements are relatively cumbersome and complicated, detracting from the beautiful simplicity of the standard bicycle. Further, modification of existing bicycles to incorporate front wheel drive as proposed in these patents would not be practical.

SUMMARY OF THE INVENTION

This invention consists of a hand operated crank used with special foot pedals to assist in propelling a bicycle through its rear wheels. The special pedals incorporate a shaft extension which, during use of the hand crank, is engaged in a roller bearing located at one end of the hand operated crank.

This equipment allows the bicyclist to utilize the hand crank when he desires, operating it with either the right or left hand. When utilizing the hand crank, steering is accomplished with the hand not used for cranking. Of course, when conditions call for use of both hands for steering, the hand crank is not utilized. It is held in brackets on the handle bars, conveniently out of the way, and the bicycle is operated in the conventional manner.

One of the attractions of this invention is that existing single speed bicycles with coaster brakes may be easily modified to obtain the benefits of hand assisted propulsion. Further, it requires no significant change in the manner in which the bicycle is operated. The normal foot pedaling action is simply augmented by the hand operated crank. Braking is accomplished as normal by backward action of the foot pedal.

DETAILED DESCRIPTION OF PREFERRED EMBODIMENTS

Figure 1:
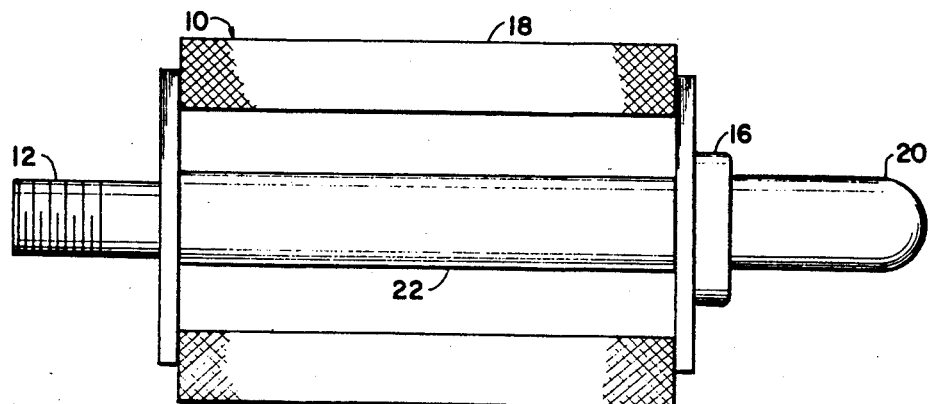
FIG. 1 is a plan view of a bicycle pedal which includes an extension for engagement with the crank mechanism of this invention.
Figure 3:
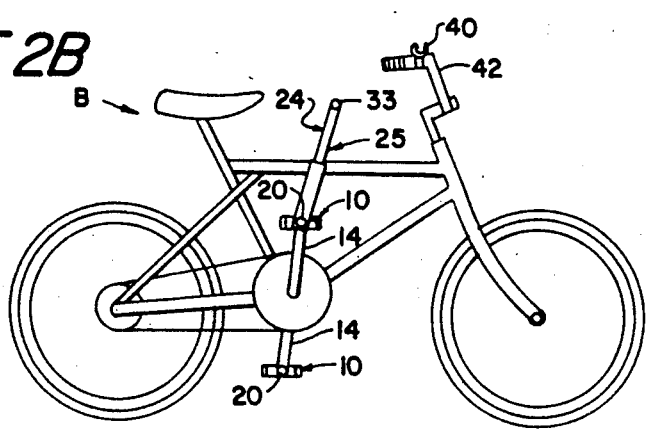
FIG. 3 is an elevational side view of a bicycle equipped with the pedal assist apparatus of this invention.

The foot pedal 10 illustrated in FIG. 1 consists of a typical bicycle pedal with threads 12 which screw into the foot crank 14, FIG. 3. The pedal 10 includes roller bearing 16, rubber treads 18, reflectors, etc. In addition, there is an extension 20 formed axially along the centerline of pedal shaft 22. As described below, extension 20 permits the roller bearing on the hand crank to be inserted over it, and permits force to be applied to the pedal through the hand crank. The shaft extension 20 is well rounded to facilitate positioning of the roller bearing on the hand crank over the extension while the bicycle is in motion.

Figures 2A, 2B:
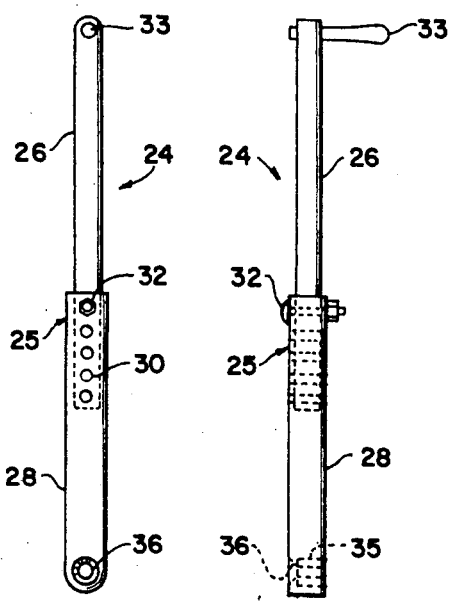
FIG. 2A is an elevational side view of the crank mechanism.
FIG. 2B is an elevational front view of the crank mechanism.

The hand crank mechanism 24, FIGS. 2A and 2B, consists of an adjustable length bar 25 including two sections 26 and 28 which telescope together. The length of the bar is readily adjusted to suit the physical needs of the cyclist. A series of holes 30 in each of the two sections 26 and 28 accomodate a bolt and nut attachment 32 which holds the bar at the desired length.

A handle 33 is formed generally perpendicularly to the axis of bar 25 at the upper end of section 26. A roller bearing 35 is installed at the end of the bar opposite the handle and more particularly in section 28. An opening 36 to this bearing is enlarged at the side which first slides over the pedal shaft extension. This facilitates engaging the hand crank mechanism 24 on the pedal shaft extension 20 while the bicycle is in motion. The cyclist will be coasting, rather than pedaling, when either engaging or disengaging the hand crank. FIG. 3 shows the crank mechanism engaged with the extension 20.

Two retaining clips 40 are installed on the handle bars 42. These clips hold the hand crank 24 out of the way, but readily accessible, when not in use.

I claim:

1. A pedal assist apparatus for a bicycle that includes a frame, a foot crank mechanism that is rotatably attached to the frame and pedals that are rotatably connected to the foot crank mechanism, each pedal including an axial shaft formed generally centrally therethrough, said apparatus comprising:

a shaft-like extension connected to at least one of the pedals and being generally axially aligned with the axial shaft; and a hand crank mechanism detached from the bicycle frame, said hand crank mechanism including generally straight bar means that are detached from the frame, bearing means connected to said bar means proximate a first end thereof for pivotably engaging said extension, and handle means connected directly to said bar means proximate an opposite second end thereof and being engagable by the rider for reciprocally operating said hand crank mechanism to assist rotation of the pedals, said bar means including an opening formed proximate said first end thereof, said bearing means being disposed about said opening and said extension being slidably and selectively introduced into, and removed from said opening while the bicycle is moving to respectively engage said bearing means with, and disengage said bearing means from said extension.

2. The apparatus of claim 1 in which said handle means extend generally perpendicularly from said upper portion of said bar means.

3. The apparatus of claim 1 in which said bar means includes a pair of bar sections, which are longitudinally adjustable relative to each other, and generally aligned, and means for selectively securing said shaft sections together in one of a plurality of relative positions to provide said bar means with a selected length.

4. The apparatus of claim 3 in which said means for securing include a first hole formed in one of said bar sections, a series of complementary second holes formed in the other said section, each being selectively alignable with said first hole and attachment means which are engaged with said aligned holes to secure said section together at said selected length.

5. The apparatus of claim 1 in which said opening includes an enlarged entrance and a section that is at least partially tapered extending transversely through said bar means.

6. The apparatus of claim 1 wherein the bicycle includes handle bars and further including means carried by the bicycle handle bars for supporting the crank mechanism between uses.

7. The apparatus of claim 1 further including a second shaft-like extension attached to the other pedal; said second extension being selectively engaged by said bearing means and responsive to reciprocal operation of said crank mechanism for assisting rotation of said other pedal.

* * * * *